(12) United States Patent
Roongta et al.

(10) Patent No.: US 11,245,525 B2
(45) Date of Patent: Feb. 8, 2022

(54) MANAGING A THIRD-PARTY RECIPIENT DIGITAL RESOURCE VEHICLE VIA A DISTRIBUTED TRUST COMPUTING NETWORK

(71) Applicant: BANK OF AMERICA CORPORATION, Charlotte, NC (US)

(72) Inventors: Ashwin Roongta, East Brunswick, NJ (US); Sayan Banerjee, Morganville, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 184 days.

(21) Appl. No.: 16/566,752

(22) Filed: Sep. 10, 2019

(65) Prior Publication Data

US 2021/0075611 A1  Mar. 11, 2021

(51) Int. Cl.
*H04L 9/32* (2006.01)

(52) U.S. Cl.
CPC .......... *H04L 9/321* (2013.01); *H04L 2209/38* (2013.01)

(58) Field of Classification Search
CPC ..... H04L 9/321; H04L 2209/38; H04L 63/00; H04L 2209/84; H04L 9/3239; H04L 9/32
See application file for complete search history.

(56) References Cited

U.S. PATENT DOCUMENTS

| | | | |
|---|---|---|---|
| 9,849,364 B2 | 12/2017 | Tran et al. | |
| 10,108,954 B2 | 10/2018 | Dunlevy et al. | |
| 10,195,513 B2 | 2/2019 | Tran et al. | |
| 10,404,771 B2 | 9/2019 | Chang | |
| 10,601,665 B2 | 3/2020 | Bathen et al. | |
| 10,657,607 B2 | 5/2020 | Linne | |
| 10,963,400 B2 | 3/2021 | Deshpande et al. | |
| 2017/0048209 A1 | 2/2017 | Lohe et al. | |
| 2017/0048234 A1 | 2/2017 | Lohe et al. | |
| 2017/0085545 A1 | 3/2017 | Lohe et al. | |
| 2017/0085555 A1 | 3/2017 | Bisikalo et al. | |
| 2017/0300876 A1 | 10/2017 | Musiala, Jr. et al. | |
| 2018/0189753 A1 | 7/2018 | Konda et al. | |
| 2018/0218176 A1* | 8/2018 | Voorhees | H04L 9/3213 |
| 2019/0197532 A1 | 6/2019 | Jayachandran et al. | |
| 2019/0361917 A1 | 11/2019 | Tran et al. | |
| 2020/0051011 A1 | 2/2020 | Dasari et al. | |
| 2020/0101367 A1 | 4/2020 | Tran et al. | |
| 2020/0327499 A1 | 10/2020 | Ganapathy | |
| 2020/0396065 A1* | 12/2020 | Gutierrez-Sheris | H04L 67/1095 |
| 2020/0403799 A1* | 12/2020 | De La Rocha Gomez-Arevalillo | H04L 9/0643 |
| 2021/0150514 A1 | 5/2021 | Schwartz | |
| 2021/0150632 A1 | 5/2021 | Schwartz | |

* cited by examiner

*Primary Examiner* — Quazi Farooqui
(74) *Attorney, Agent, or Firm* — Moore & Van Allen PLLC; James C. Edwards

(57) ABSTRACT

A system for managing a digital resource vehicle within a distributed trust computing network, such as a blockchain network or the like. The digital resource vehicle monitors for occurrence of output-triggering events and in response to determining the occurrence of event, determines output recipients, distribution portions and initiates execution of the resource events. The distributed trust computing network ensures immutability of the digital resource vehicle and provides a source of truth for verification/validation of triggering events and resulting resource events.

18 Claims, 5 Drawing Sheets

MANAGING A THIRD-PARTY RECIPIENT DIGITAL RESOURCE VEHICLE VIA A DISTRIBUTED TRUST COMPUTING NETWORK

FIELD OF THE INVENTION

The present invention is generally related to processing via a distributed trust computing network (e.g., blockchain network) and, more specifically, managing outputs and other actions associated with a third-party recipient digital resource vehicle via a distributed trust computing network.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by presenting systems, methods, computer program product and/or the like that provide for a distributed trust computing network (e.g., blockchain network or the like) approach to managing a digital resource vehicle. By having the distributed trust computing network process the digital resource vehicle it ensures immutability, i.e., the digital resource vehicle cannot be changed or challenged.

Additionally, since the distributed trust computing network serves as a source of truth, events and actions associated with the resource vehicle are verified with a high level of certainty. For example, the distributed trust computing network provides for verifying the identity of resource vehicle-related parties and the occurrence of events (such as dates, status changes or the like) that trigger actions (e.g., outputs, valuations and the like) in the resource vehicle. In addition, the execution of the resource vehicle-related actions are verifiable via the distributed trust computing network.

Further, since the resource vehicle is digital (i.e., contains the rules and algorithms required for execution) and is managed through the distributed trust computing network, the execution of resource vehicle-related actions (e.g., determination of output parties and their respective output share/amounts) are assured to be accurate, i.e., in accordance with the terms and/or rules of the resource vehicle. Moreover, since the digital nature of the resource vehicle results in manual intervention being limited and, in some embodiments, eliminated, the resource vehicle can be efficiently managed with triggering events being verified and resulting actions, such as resource output, being taken with minimal delay.

A system for managing a digital resource vehicle for beneficiary output defines first embodiments of the invention. The system includes a distributed trust computing network comprising a plurality of decentralized nodes. Each decentralized node has a first memory and at least one first processor in communication with the first memory. The first memory of the decentralized nodes is configured to store at least one distributed ledger that includes a plurality of blocks that store data. The distributed trust computing network is configured to certify that the data stored in the blocks is authentic and unaltered.

The system additionally includes a computing platform disposed in the distributed trust computing network and including a second memory and at least one second processor in communication with the second memory. The second memory stores a digital resource vehicle including instructions that are executable by the second processor. The instructions are configured to monitor for an occurrence of a plurality of first events that trigger an output of resources from the digital resource vehicle. In response to determining the occurrence of one of the plurality of first events, the instructions are configured to store data associated with the first event as at least a portion of a block within one of the distributed ledgers of the distributed trust computing network, determine one or more beneficiaries for receiving at least a portion of the output of resources from the digital resource vehicle, and determine, for each of the one or more beneficiaries, the portion of the output of resources from the digital resource vehicle. The instructions are further configured to initiate one or more resource events that result in output of resources from the resource vehicle to the one or more determined beneficiaries in the determined portions, and store data associated with each of the one or more resource events as at least a portion of a block within one of the distributed ledgers of the distributed trust computing network.

In specific embodiments of the system, the instructions are further configured to, in response to determining the occurrence of one of the plurality of first events, determine, from the digital resource vehicle, validation requirements for validating the occurrence of the first event. In such embodiments of the system, the instructions are further configured to, in response to receiving the validation requirements, validate an authenticity of the occurrence of the first event through consensus by the plurality of decentralized nodes of the distributed trust computing network. In such embodiments of the system, storing data associated with the first event as at least a portion of a block within one of the distributed ledgers provides verification that the authenticity of the first event has been validated through consensus by the plurality of decentralized nodes of the distributed trust computing network.

In further specific embodiments of the system, the instructions are further configured to determine, from the digital resource vehicle, validation requirements for validating an occurrence of the one more resource events. In such embodiments of the system, the instructions are further configured to, in response to receiving the validation requirements, validate an authenticity of the occurrence of the one or more resource events through consensus by the plurality of decentralized nodes of the distributed trust computing network. In such embodiments of the system, storing data associated with each of the one or more resource events as at least a portion of a block within one of the distributed ledgers provides verification of the occurrence of the one or more distribution transactions.

In further specific embodiments of the system, the instructions are further configured to monitor for the occurrence of the plurality of events, wherein the plurality of events include predefined dates included within or determinable from the digital resource vehicle and/or a change in status of an entity associated with the digital resource vehicle.

In still further specific embodiments of the system, initiating one or more resource events further comprises generating instructions for the one or more resource events and communicating the instructions to one or more a holder of the resources of the digital resource vehicle.

In other specific embodiments of the system, the instructions are further configured to determine, from the digital resource vehicle, identity verification requirements for verifying identity of the one or more beneficiaries. In such embodiments of the system, the instructions are further configured to, in response to receiving the identity verification requirements for at least one of the beneficiaries, verify an identity of the at least one of the beneficiaries through consensus by the plurality of decentralized nodes of the distributed trust computing network.

Moreover, in further embodiments of the system, the instructions are further configured to monitor for an occurrence of a plurality of second events that trigger a digital resource vehicle-related action and, in response to determining the occurrence of one of the plurality of second events, (i) store data associated with the second event as at least a portion of a block within one of the distributed ledgers of the distributed trust computing network, and (ii) initiate the digital resource vehicle-related action> The instructions are further configured to store data associated with the digital resource vehicle-related action as at least a portion of a block within one of the distributed ledgers of the distributed trust computing network. In such embodiments of the invention, the digital resource vehicle-related action includes valuation of the resources of the digital resource vehicle.

In additional embodiments of the system, the instructions are further configured to monitor a plurality of external information sources for the occurrence of the plurality of events that trigger the output of resource from the digital resource vehicle.

A computer-implemented method for managing a digital resource vehicle for beneficiary output defines second embodiments of the invention. The method is implemented by one or more processing devices and includes storing a digital resource vehicle within a distributed trust computing network comprising a plurality of decentralized nodes. Each decentralized node has a first memory and at least one first processor in communication with the memory. The first memory of the decentralized nodes is configured to store at least one distributed ledger including a plurality of blocks that store data. The distributed trust computing network is configured to certify that the data stored in the blocks is authentic and unaltered.

The method further includes executing the digital resource vehicle to (i) monitor for an occurrence of a plurality of events that trigger an output of resources from the digital resource vehicle, and, in response to determining the occurrence of one of the plurality of events, (ii) store data associated with the event as at least a portion of a block within one of the distributed ledgers of the distributed trust computing network, (iii) determine one or more beneficiaries for receiving at least a portion of the output of resources from the digital resource vehicle, (iv) determine, for each of the one or more beneficiaries, the portion of the output of resources from the digital resource vehicle, and (v) initiate one or more resource events that result in output of resources from the digital resource vehicle to the one or more determined beneficiaries in the determined portions. The method additionally includes executing the digital resource vehicle to store data associated with each of the one or more resource events as at least a portion of a block within one of the distributed ledgers of the distributed trust computing network.

In further specific embodiments of the method executing the digital resource vehicle further includes executing the digital resource vehicle to, in response to determining the occurrence of one of the plurality of events, determine, from the digital resource vehicle, validation requirements for validating the occurrence of the event, and, in response to receiving the validation requirements, validate an authenticity of the occurrence of the event through consensus by the plurality of decentralized nodes of the distributed trust computing network. The storing data associated with the event as at least a portion of a block within one of the distributed ledgers provides verification that the authenticity of the event has been validated through consensus by the plurality of decentralized nodes of the distributed trust computing network.

In still further specific embodiments of the method executing the digital resource vehicle further includes executing the digital resource vehicle to determine, from the digital resource vehicle, validation requirements for validating an occurrence of the one more resource events, and, in response to receiving the validation requirements, validate an authenticity of the occurrence of the one or more resource events through consensus by the plurality of decentralized nodes of the distributed trust computing network. Storing data associated with each of the one or more resource events as at least a portion of a block within one of the distributed ledgers provides verification of the occurrence of the one or more resource events.

A computer program product including a non-transitory computer-readable medium defines third embodiments of the invention. The computer-readable medium includes a first set of codes for causing a computer to monitor for an occurrence of a plurality of first events that trigger a output of resources from a digital resource vehicle stored within a distributed trust computing network. The distributed trust computing network includes a plurality of decentralized nodes. Each decentralized node has a first memory and at least one first processor in communication with the memory. The first memory of the decentralized nodes is configured to store at least one distributed ledger including a plurality of blocks that store data. The distributed trust computing network is configured to certify that the data stored in the blocks is authentic and unaltered. The computer-readable medium includes a second set of codes for causing a computer to, in response to determining the occurrence of one of the plurality of events, store data associated with the event as at least a portion of a block within one of the distributed ledgers of the distributed trust computing network. The computer-readable medium includes a third set of codes for causing a computer to, in response to determining the occurrence of one of the plurality of events, determine one or more third-party beneficiaries for receiving at least a portion of the distribution of assets from the digital resource vehicle. Further, the computer-readable medium includes a fourth set of codes for causing a computer to, in response to determining the occurrence of one of the plurality of events, determine, for each of the one or more beneficiaries, the portion of the output of resources from the digital resource vehicle and a fifth set of codes for causing a computer to, in response to determining the occurrence of one of the plurality of events, initiate one or more resource events that result in output of resources from the digital resource vehicle to the one or more determined beneficiaries in the determined portions. Moreover, the computer-readable medium includes a sixth set of codes for causing a computer to store data associated with each of the one or more resource events as at least a portion of a block within one of the distributed ledgers of the distributed trust computing network.

In specific embodiments of the computer program product the second set of codes is further configured to cause the computer to (i) determine, from the digital resource vehicle, validation requirements for validating an occurrence of the one more resource events; and (ii) in response to receiving the validation requirements, validate an authenticity of the occurrence of the one or more resource events through consensus by the plurality of decentralized nodes of the distributed trust computing network. The storing data associated with each of the one or more resource events as at least a portion of a block within one of the distributed ledgers provides verification of the occurrence of the one or more resource events.

Thus, according to embodiments of the invention, which will be discussed in greater detail below, the present invention provides for managing a digital resource vehicle within a distributed trust computing network. The distributed trust computing network ensures immutability of the resource vehicle, i.e., the resource vehicle cannot be changed or challenged. Additionally, since the distributed trust computing network serves as a source of truth, events, actions and identities associated with the resource vehicle are verified with a high level of certainty.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
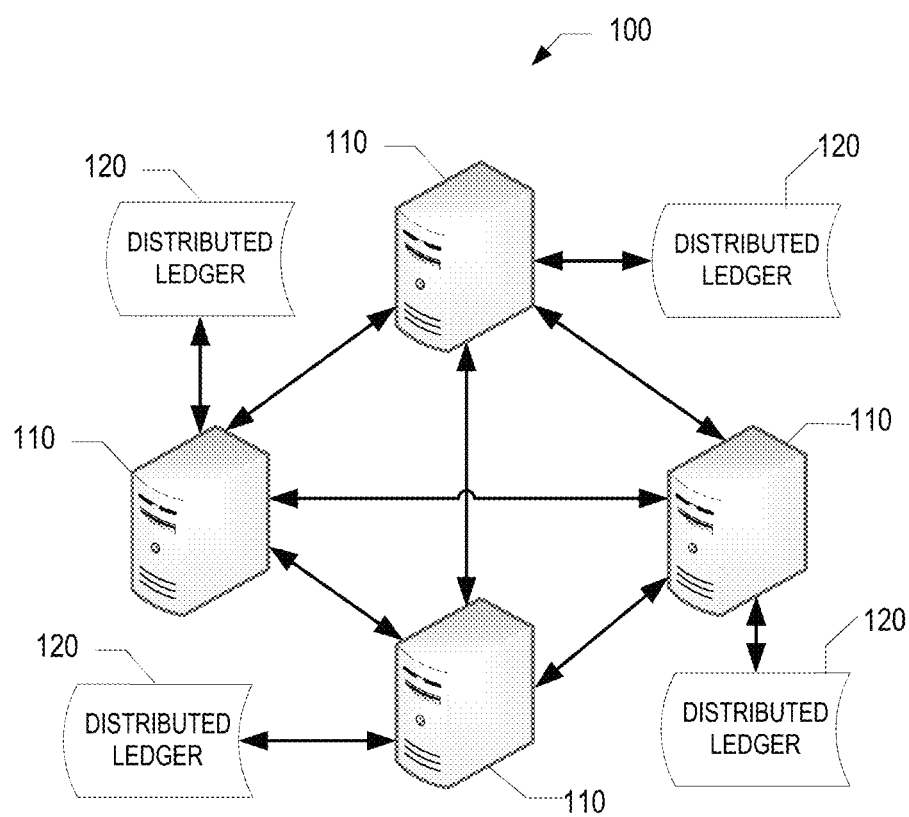
Figure 2:
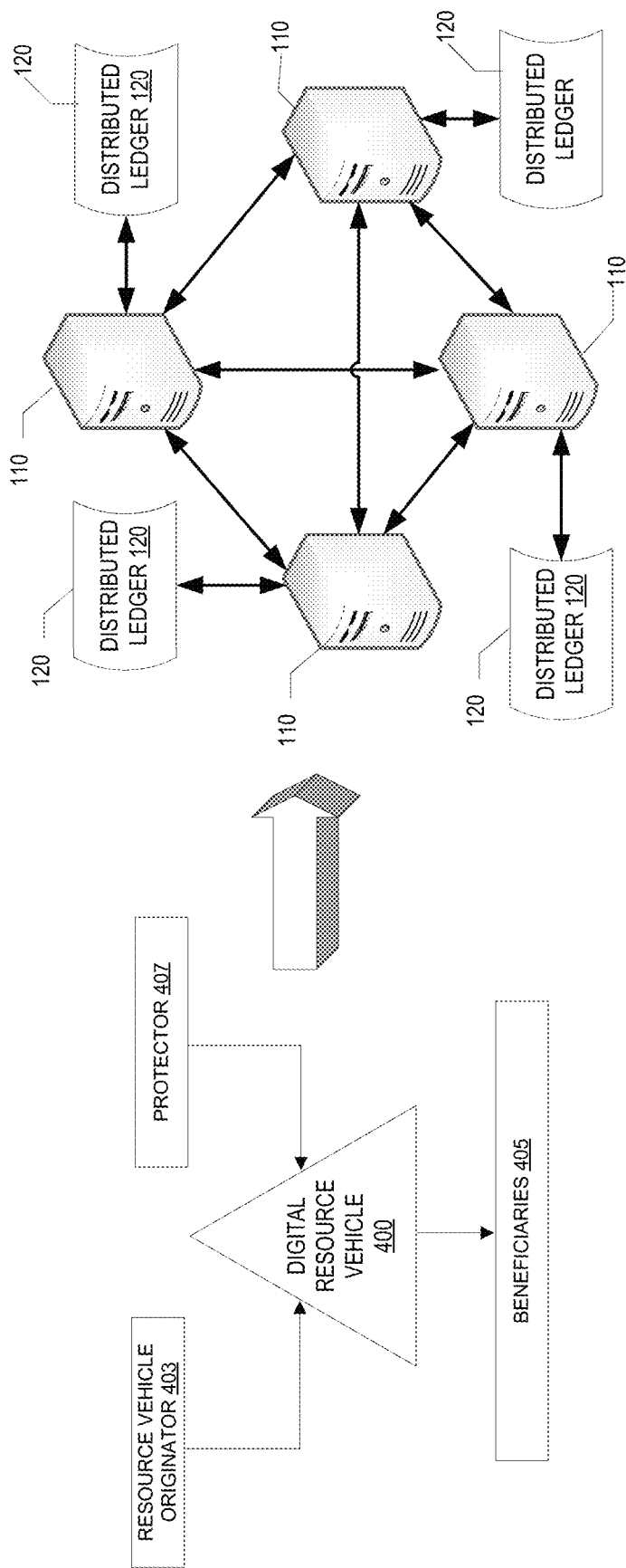
Figure 3:
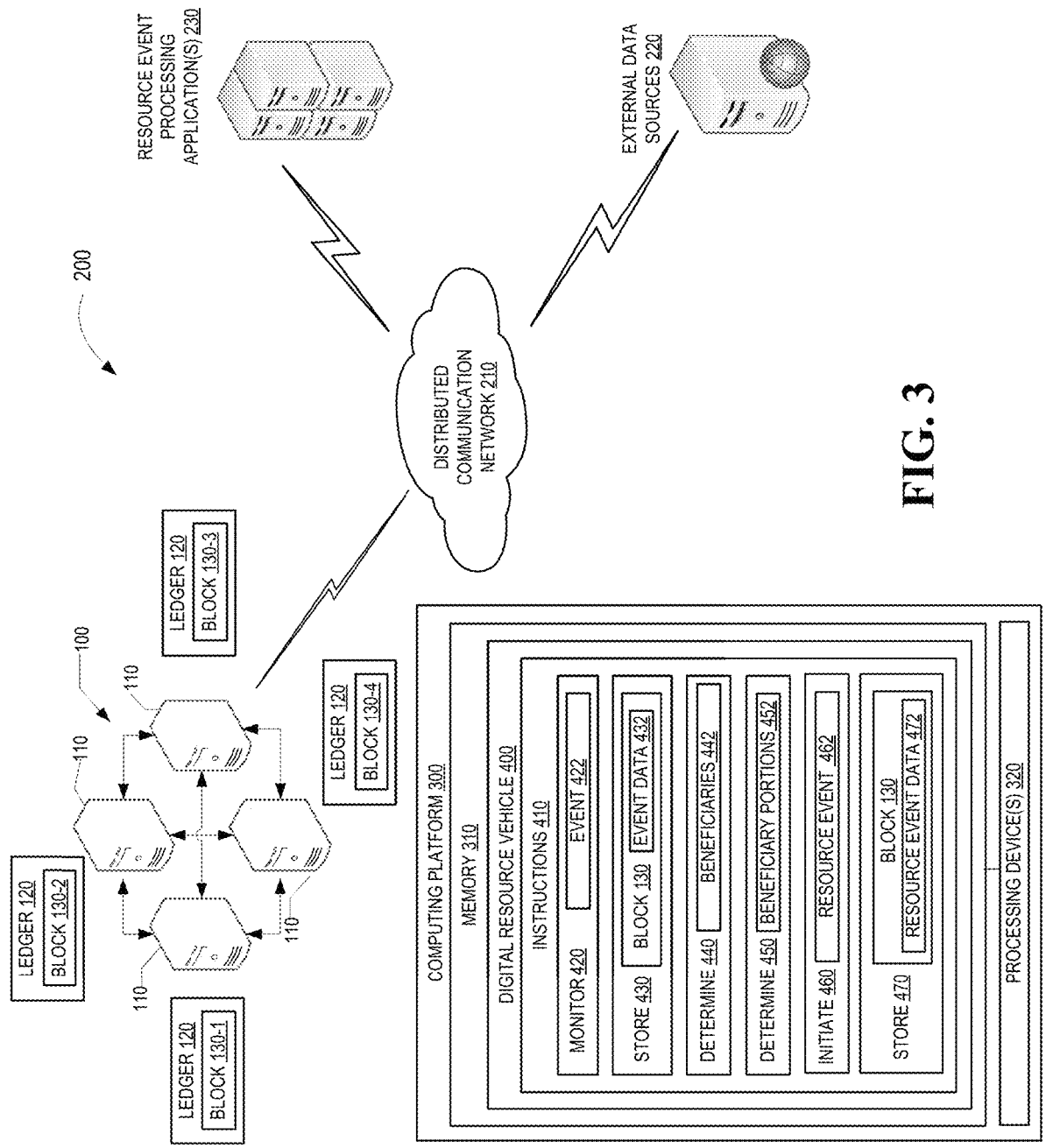
Figure 4:
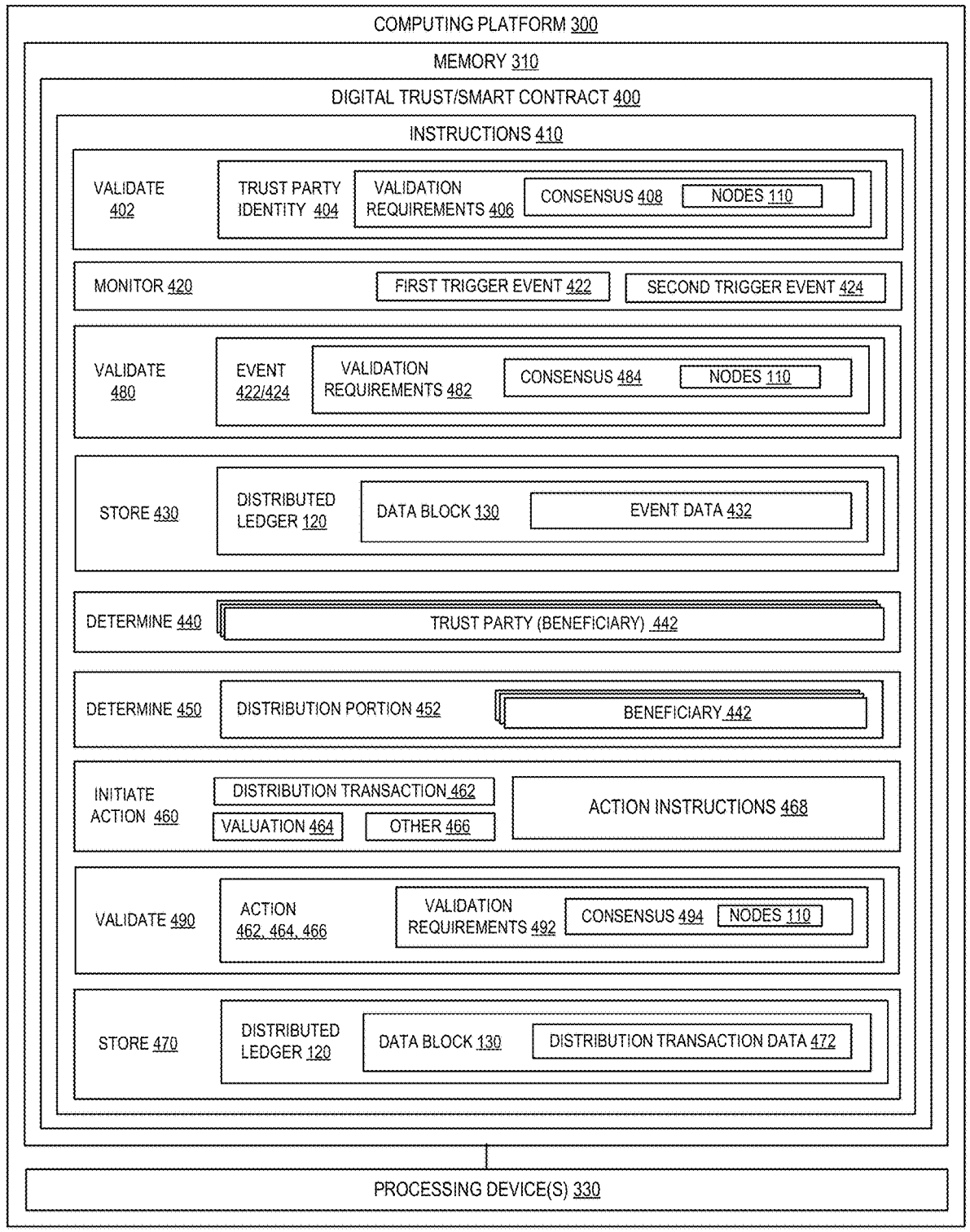
Figure 5:
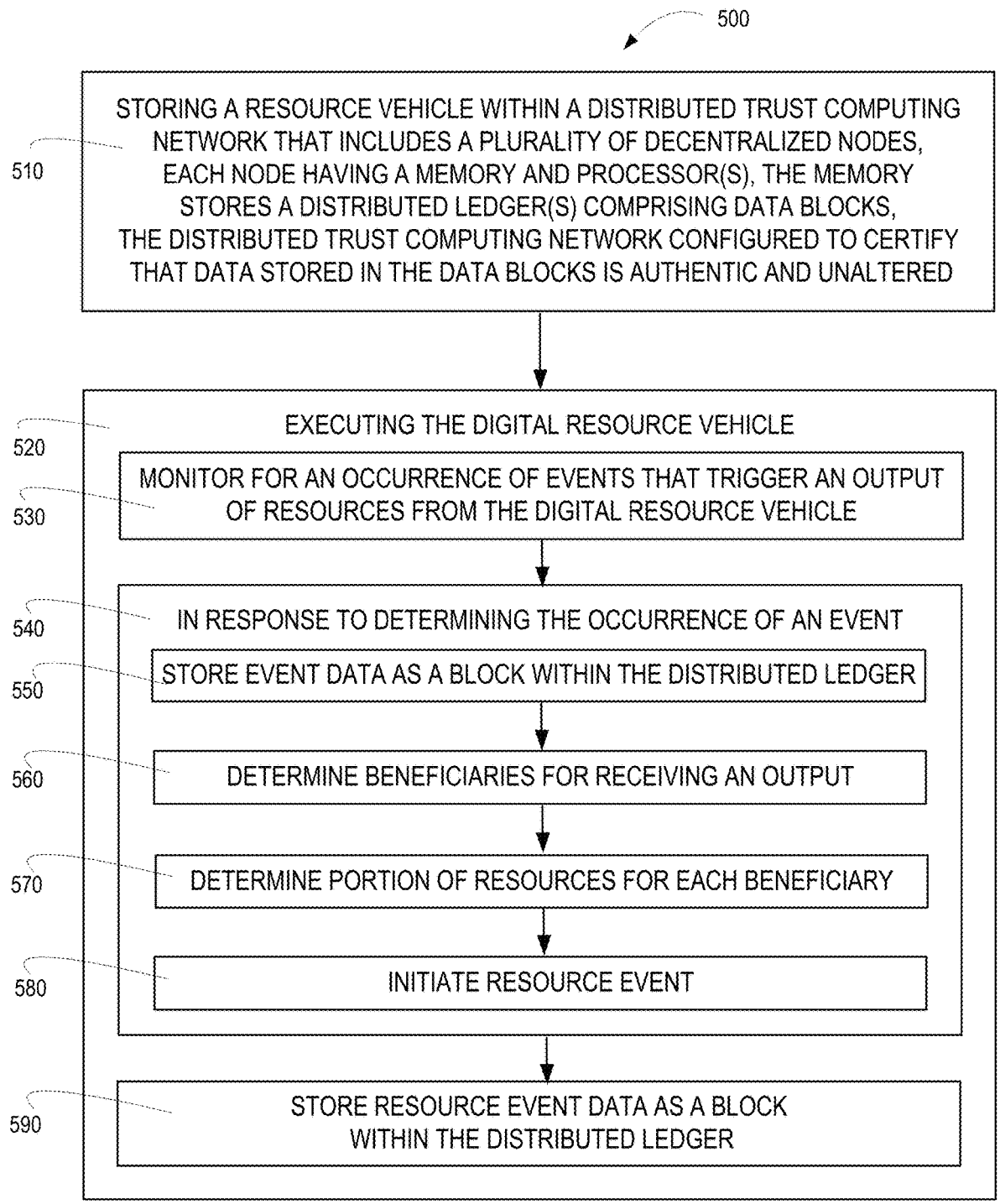

Having thus described embodiments of the disclosure in general terms, reference will now be made to the accompanying drawings, wherein:

FIG. 1 is a schematic diagram of a distributed trust computing network, in accordance with embodiments of the present invention;

FIG. 2 is a schematic diagram illustrating a digital resource vehicle, parties associated with the resource vehicle and the incorporation and execution of the digital resource vehicle within distributed trust computing network, in accordance with some embodiments of the present disclosure;

FIG. 3 is a schematic and block diagram of a system for managing a digital resource vehicle via a distributed trust computing network, in accordance with embodiment of the present invention;

FIG. 4 is a block diagram of a computing platform including a digital resource vehicle, in accordance with embodiments of the present invention; and FIG. 5 is flow diagram of a method for managing a digital resource vehicle via a distributed trust computing network, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Conventional fiduciary relationship trusts are managed by trust administrators, who have a responsibility to manage/administer the trust according to the legally binding trust agreement. Trust agreements tend to be complex in nature and, based on the structure of the agreement and clauses contained therein, may be open to interpretation. It is the trust administrator that is tasked with making ultimate decisions regarding interpretation of the trust agreement, as well as, conducting other actions related to the trust, such as determining when distributions occur, who receives distribution, the amount of each distributions, when valuations should occur and the like. In many instances this requires the trust administrator to be aware as to events that trigger such as actions. Since all of these actions require human intervention, they are prone to inefficiencies and inaccuracies.

In many instances, the parties associated with a trust (e.g., the grantor, the trustee, the beneficiaries, the remainderman and the like) may seek to challenge the trust agreement from a legal perspective to ensure that their respective best interests are met. Such challenges not only call into question the intent of the grantor but are also are time and cost intensive.

Therefore, a need exists to develop systems, methods and the like that eliminate the need to have a trust administrator manage a trust. In this regard, the desired system should eliminate the need for human interaction in tracking events that trigger actions associated with the trust, as well, determining factors/attributes associated with such events (e.g., distribution parties, distribution amount and the like). In addition, the systems, methods and the like should provide for a trust that guarantees the grantors intent is met. In this regard, the systems, methods and the like should provide for a trust that is not subject to interpretation and immutable (i.e., not subject to legal challenge). Moreover, the desired systems, methods and the like should provide verifiable proof that triggering events have occurred and that triggered actions have occurred in accordance with the legal requirements of the trust.

Thus, according to embodiments of the invention, which will be described in more detail below, systems, methods and computer program products are disclosed that for provide for managing a digital resource vehicle (e.g., a trust in the form of a smart contract or the like) via a distributed trust computing network (e.g., blockchain network or the like). In specific embodiments of the invention, the digital resource vehicle and/or distributed trust computing network are configured to monitor for triggering events and, in response to detecting an event, conduct a resource vehicle-related action, such as an output of resources from the resource vehicle (e.g., distribution of trust assets from the trust). In this regard, the digital resource vehicle in conjunction with the distributed trust computing network determines beneficiaries and output portions for each entity/party and initiates the resource event. By having the distributed trust computing network as the execution platform for the digital resource vehicle it ensures immutability, i.e., the digital resource vehicle cannot be changed or challenged.

In specific embodiments of the invention, the distributed trust computing network provides the digital resource vehicle with requisite verification and/or validation of triggering events, resulting resource vehicle-related actions and/or the identity of resource vehicle-related parties. Thus, the distributed trust computing network provides the digital resource vehicle with the same or a higher level or verification/validation that would be afforded a non-digital resource vehicle managed manually.

Further, the digital nature of the resource vehicle provides for the rules and algorithms required for execution to be contained therein. As a result, the execution of resource vehicle-related actions (e.g., determination of output parties and their respective output share/amounts) are assured to be accurate, i.e., in accordance with the terms and/or rules of the resource vehicle.

Turning now to the figures, FIG. 1 a schematic diagram is provided of an exemplary distributed trust computing network 100 otherwise referred to herein as a blockchain network or "block chain", in accordance with embodiments of the present invention. The distributed trust computing network 100 includes a distributed database that maintains, e.g., a list of data records, or the like. The security of the data maintained within the trust network is enhanced by the distributed nature of the network/block chain. The distributed trust computing network 100 typically includes several nodes 110, which may be one or more systems, machines, computers, databases, data stores or the like operably connected with one another. In some instances, each of the nodes 110 or multiple nodes 110 are maintained by different entities. A distributed trust computing network 100 typically works without a central repository or single administrator. One well-known application of a distributed trust computing network/block chain is the public ledger of transactions for cryptocurrencies such as used in bitcoin. The data records recorded in the distributed trust computing network/block chain are enforced cryptographically and stored on the nodes 100 of the block chain.

A distributed trust computing network 100 provides numerous advantages over traditional storage networks/databases. A large number of nodes 110 of a trust network may reach a consensus regarding the validity of data maintained within a block of the blockchain. Additionally, when multiple versions of a data record exist on the ledger 120, multiple nodes 110 can converge on the most up-to-date version of the data record, such that the most-up-to-date version of the data record is the only version that is deemed validated. For example, any node 110 within the distributed trust computing network 100 that stores a data record can determine within a level of certainty whether the record can be authenticated/authorized to take place and become final by confirming that no conflicting data records are confirmed by the distributed trust computing network/block chain elsewhere.

The blockchain chain typically has two primary types of data records. The first type is the record type, which consists of the actual data stored in a block 130 within a distributed ledger 120. The second type is the block type, which are records that confirm when and in what sequence certain events became recorded as part of the blockchain. Data records and the events associated therewith are created by participants using the distributed trust computing network in its normal course of business, for example, when data record is received, a block(s) 130 is created by users known as "miners" who use specialized software/equipment to create blocks 130. Holders (also, referred to as users) of a block 130 of the distributed trust computing network agree to store a record within the distributed trust computing network 100 and the related records are passed around to various nodes 110 of the distributed trust computing network 100. A "valid" record or related event is one that can be validated based on a set of rules that are defined by the particular system implementing the distributed trust computing network/block chain.

A distributed trust computing network/block chain 100 is decentralized—meaning that a distributed ledger 120 (i.e., a decentralized ledger) is maintained on multiple nodes 110 of the trust network/block chain 100. One node 110 in the distributed trust computing network 100/block chain may have a complete or partial copy of the entire ledger 120 or set of records and/or blocks 130 on the distributed trust computing network 100/block chain. Events are initiated at a node 110 of a distributed trust computing network 100/block chain and communicated to the various nodes 110 of the distributed trust computing network 100/blockchain. Any of the nodes 110 can validate a record or an associated event, add the record or the details of the storage event to its copy of the distributed ledger 120, and/or broadcast the record or details of the storage event, its associated validation (in the form of a block 130) and/or other data to other nodes 110. The distributed trust computing network 100 shown in FIG. 1 is configured to perform one or more of the steps or functions performed by the system shown in FIG. 3, the computing platform shown in FIG. 4 and the methods described by FIG. 5.

Referring to FIG. 2 a schematic diagram is depicted illustrating a digital resource vehicle, parties associated with the digital resource vehicle and the execution of such a resource vehicle by a distributed trust computing network, in accordance with embodiments of the present invention. The digital resource vehicle 400 is configured to distribute resources (e.g., funds and/or securities) contributed by the resource vehicle originator (e.g. settlor/grantor) 402 of the resource vehicle in accordance with the originator's intentions. In this regard, the digital resource vehicle 400 acts as a smart contract that includes a series of rules and algorithms configured to satisfy the originator's resource vehicle intentions. As used herein, "smart contracts" are computer processes that facilitate, verify and/or enforce performance of a contract between parties. One fundamental purpose of smart contracts is to integrate the practice of contract law and related business practices with electronic commerce protocols between people on the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing.

Smart contract infrastructure can be implemented by replicated asset registries and contract execution using cryptographic hash chains and *Byzantine* fault tolerant replication. For example, each node 110 in a peer-to-peer network or blockchain/distributed trust computing network 100 (shown in FIG. 1) may act as a title registry and escrow, thereby executing changes of ownership and implementing sets of predetermined rules that govern actions/transactions on the network. Each node 110 may also check the work of other nodes and in some cases, as noted above, function as miners or validators. In some embodiments, the nodes 110 in the block chain may be an entity such as a financial institution that function as gateways for other entities.

The digital resource vehicle 400 identifies one or more beneficiaries 405 and, in some instances, other receiving parties/entities, such as remainderman (i.e., entities that take place of the beneficiary as a result of a predefined event, such as death or the like). The beneficiaries 405 of the resource vehicle are chosen by the originator 403 and receive output/distribution of resources from the resource vehicle in response to predefined events (e.g., specific dates, change in legal status of party, such as death, maturity, marital, or the like). Additionally, in the event that the one or more of the beneficiaries require consent (e.g., minor, elderly or otherwise incapacitated) protectors 407 may be chosen by the originator 403 or appointed by legal authorities.

In conventional resource vehicles, the resources are held by a representative and managed manually or the like. However, in the digital resource vehicle 400 of the present invention most, if not all, of the functions typically performed manually are performed automatically by the digital resource vehicle 400, such as monitoring occurrence of action triggering events and executing the triggered actions. For example, the digital resource vehicle 400 is configured to monitor events that trigger an output of resources and, in response to determining such an event, determine the beneficiaries for resource output and the portion of the output to be distributed to each of the determined beneficiaries. Additionally, the digital resource vehicle 400 is configured to set in motion/initiate the output of resources by generating and communicating resource event instructions.

In accordance with embodiments of the present invention, the digital resource vehicle 400 is executed by a distributed trust computing network 100. The distributed trust computing network 100 provides for validating action triggering events and the resulting actions, as well as, validating the identity of trust parties, such as beneficiaries/remainderman 405, protectors 407 and the like.

Thus, the smart contract nature of the digital resource vehicle 400 and the execution of such on the distributed trust computing network 100 results in a resource vehicle that is immutable and not subject to interpretation and/or changes.

Referring to FIG. 3 a schematic/block diagram is presented of a system 100 for managing a digital resource vehicle, in accordance with embodiments of the present invention. The system includes a distributed trust computing network 100, such as a blockchain network comprising a plurality of decentralized nodes 110 each having a first memory (not shown in FIG. 3) and at least on first processor (not shown in FIG. 3) in communication with the first memory. The first memory of the decentralized nodes 110 is configured to store at least one distributed ledger 120 that comprises a plurality of data blocks 130-1-130-4. The distributed trust computing network is configured to certify/validate that the data stored in data blocks 130-1-130-4 is authentic and unaltered.

The system additionally includes computing platform 300 that is disposed in the distributed trust computing network 100 and includes second memory 310 and at least one second processor 310 in communication with second memory 310. Since computing platform 300 is disposed in distributed trust computing network 100, second memory 310 and second processor(s) may, in specific embodiments, be embodied in the same physical entities as first memory and first processor(s). The second memory 310 stores a digital resource vehicle 400, for example a digital trust, including instructions 410 that are executable by the second processor(s) 330. The instructions 410 are configured to monitor 420 for an occurrence of one of a plurality of events 422 that trigger an out of resources from the digital resource vehicle 400, for example a distribution of assets from the digital trust 400. The events 422, which may be defined by the rules of the digital vehicle may include, but are not limited to, predetermined dates (e.g., defined by time intervals), change of legal status of a resource vehicle party (e.g., death, predefined length of existence, legal length of existence, marital or the like). Monitoring may include monitoring external data sources 220 accessible to the distributed trust computing network 100 via distributed communication network 210 (e.g., the Internet and/or one or more intranets). The external data sources 220 may be web-based news sources or the like that provide death notices, marriage notices and the like. In response to determining/detecting one of the plurality of events 422, the instructions 410 are configured to store 430 event data 432 in a data block 130 of the distributed ledger 120 of distributed trust computing network 100. The storage 430 of the event data 432 in the data block 130 serves as verifiable truth that the event occurred.

Further, in response to determining/detecting the event 422, the instructions 410 are configured to determine 440 one or more beneficiaries 442 for receiving at least a portion of an output of resources, e.g., distribution of assets (e.g., funds, securities, real property or the like) from the resource vehicle. The beneficiaries 442 are defined by the resource vehicle and/or the rules of the resource vehicle. In specific embodiments of the system, the event itself will define the beneficiaries. Beneficiaries 442, as used herein, include remainderman or any other individual or entity to which resources from the resource vehicle are distributed. In addition, the instructions 410 are configured to determine 450, for each of the determined beneficiaries 442 the portion 452 of the output of resources from the resource vehicle. The portion 452 may be a set amount, a percentage of the overall output or may otherwise be defined according to the rules of the digital resource vehicle 400.

Moreover, the instructions 410 are configured to initiate 460 one or more resource events that result in output of resources from the resource vehicle to the one or more beneficiaries 442 in the determined portions 452. For example, the instructions may be configured to send resource event requests/instructions to a resource event processing application 230 operated and/or managed by an entity in possession of the resources.

Further, in response to the distribution transaction occurring, instructions 410 are configured to store 470 resource event data 472 in a data block 130 of the distributed ledger 120 of distributed trust computing network 100. The storage 470 of the resource event data in the data block 130 serves as verifiable truth that the resource event occurred in the amount/portion stated in the data.

Referring to FIG. 4 a block diagram is presented of the computing platform 300 including a smart contract 400, in accordance with embodiments of the present invention. The computing platform 300 is disposed in the distributed trust computing network 100 and may comprise one or more computing devices (e.g., servers, computing devices, or the like), is configured to execute algorithms, modules, routines, applications, such as digital trust 400. Computing platform 300 includes memory 310, which may comprise volatile and non-volatile memory, such as read-only and/or random-access memory (RAM and ROM), EPROM, EEPROM, flash cards, or any memory common to computing platforms). Moreover, memory 310 may comprise cloud storage, such as provided by a cloud storage service and/or a cloud connection service.

Further, computing platform 300 also includes at least one processing device 320, which may be an application-specific integrated circuit ("ASIC"), or other chipset, logic circuit, or other data processing device. Processing device(s) 320 may execute one or more application programming interface (APIs) (not shown in FIG. 4) that interface with any resident programs, such as digital trust 400 or the like, stored in the memory 310 of the computing platform 300 and any external programs. Processing devices(s) 320 may include various processing subsystems (not shown in FIG. 4) embodied in hardware, firmware, software, and combinations thereof, that enable the functionality of the computing platform 300 and the operability of the computing platform 300 on the distributed trust computing network 100 (shown in FIG. 3). For example, processing subsystems allow for initiating and maintaining communications and exchanging data with other networked devices. For the disclosed aspects, processing subsystems of processing device 320 may include any subsystem used in conjunction with digital trust 400 and related tools, routines, sub-routines, algorithms, sub-algorithms, sub-modules thereof.

Computing platform 300 may additionally include a communications module (not shown in FIG. 4) embodied in hardware, firmware, software, and combinations thereof, that enables electronic communications between the computing platform 300 and other network devices, such as external data sources 220 and transaction processing applications 230 (shown in FIG. 3). Thus, communication module may include the requisite hardware, firmware, software and/or combinations thereof for establishing and maintaining a network communication connection with one or more network devices.

Memory 310 of computing platform 300 stores a digital trust 400 including instructions 410 that are executable by the second processor(s) 330. In specific embodiments of the invention the instructions 410 are configured to validate 402 trust party identities 404, such as beneficiaries or the like. The validation 402 process may occur upon initially loading the digital trust 400 on the distributed trust computing network 100 and/or just prior to a trust action involving a trust party, such as just prior to initiating a distribution transaction or the like. Validation 402 may include determining, from the trust rules, validation requirements 406, which may vary depending on the type of trust party. In response to receiving or otherwise obtaining the requisite validation requirements 406, a plurality of the nodes 110 of the distributed trust computing network 100 reach a consensus 408 on the authenticity of the validation requirements 406 and validate the trust party's identity 404.

As previously discussed, the instructions 410 are further configured to monitor 420 for an occurrence of one of a plurality of first events 422 that trigger a distribution of assets from the digital trust 400 and, in other specific embodiments, second events 424 that trigger other trust-related actions, such as a valuation or the like. The events 422, 414, which may be defined by the rules of the trust may include, but are not limited to, predetermined dates (e.g., specific data or time intervals), change in legal status of a trust party (e.g., death, attaining a predefined length of existence, reaching a legal length of existence, marital or the like). Monitoring 410 may include monitoring external data sources 220, such as Internet-based public news sources, databases or the like that provide death notices, marriage notices and the like.

In specific embodiment of the invention, in response to determining/detecting one of the plurality of events 422, the instructions 410 are configured to validate 480 the occurrence of the event 422, 424. The validation 480 process may include determining, from the trust rules, validation requirements 482, which may vary depending on the type of the event. In response to receiving or otherwise obtaining the requisite validation requirements 482, a plurality of the nodes 110 of the distributed trust computing network 100 reach a consensus 484 on the validity and authenticity of the validation requirements 482 and validate the event 422, 424. In response to validating 480 the event 422, 424, the instructions 410 are configured to store 430 event data 432 in a data block 130 of the distributed ledger 120 of distributed trust computing network 100. The storage 430 of the event data 432 in the data block 130 serves as verification of the authenticity of the event 424, 426.

Further, in response to determining/detecting the event 422, 424, the instructions 410 are configured to determine 440 the trust parties 442 associated with the action to be taken, for example, in those embodiments in which the action is distribution of assets, one or more beneficiaries 442 are determined for receiving at least a portion of a distribution of assets (e.g., funds, securities, real property or the like) from the trust. The trust parties 442 associated with the action are defined by the trust and/or the rules of the trust. In specific embodiments of the invention, the event itself will define the trust parties 442 associated with the action. In addition, in those embodiments of the invention in which the action is distribution of trust assets, the instructions 410 are configured to determine 450, for each of the determined beneficiaries 442, the portion 452 of the distribution of assets from the trust. The portion 452 may be a set amount, a percentage of the overall distribution or may otherwise be defined according to the rules of the digital trust 400.

Moreover, the instructions 410 are configured to initiate 460 the action, such as a distribution transaction 461, a valuation 464 or any other action 466 defined by the digital trust 400. In this regard, the instructions 410 may be configured to generate and communicate to action instructions 468. For example, the instructions may be configured to send distribution requests/instructions to a transaction processing application 230 operated and/or managed by the trustee or any other entity in possession of the trust assets or a valuation request to a trustee processing system or the like.

Further, in response to the trust action occurring, instructions 410 are configured to validate 490 the occurrence of the action 462, 464, 466. The validation 490 process may include determining, from the trust rules, validation requirements 492, which may vary depending on the type of the action. In response to receiving or otherwise obtaining the requisite validation requirements 492, a plurality of the nodes 110 of the distributed trust computing network 100 reach a consensus 494 on the validity and authenticity of the validation requirements 492 and validate the action 462, 464, 466. In response to validating 490 the action 462, 464, 466, the instructions 410 are configured to store 470 action data 472 in a data block 130 of the distributed ledger 120 of distributed trust computing network 100. The storage 470 of the action data 472 in the data block 130 serves as verification of the occurrence and authenticity of the action 462, 464, 466.

Referring to FIG. 5 a flow diagram is depicted of a method 500 for managing a digital trust via a distributed trust computing network, in accordance with embodiments of the present invention. At Event 510, a digital trust is stored within a distributed trust computing network. The digital trust computing network includes a plurality of decentralized nodes. Each node has a memory and at least one processor in communication with the memory, collectively referred to as the first memory. The first memory of the decentralized nodes stored a distributed ledger that includes a plurality of data blocks. The distributed trust computing network is configured to certify/validate that the data stored in the blocks is authentic and unaltered.

At Event 520, the digital trust is executed to manage the trust. Executing the digital trust includes, at Event 530, monitoring for an occurrence of one of a plurality of events that trigger a distribution of assets from the digital trust. Monitoring may include, but is not limited to, monitoring external data sources, such as public Internet-based news sources or databases for the occurrence of events. The events may be defined in the trust rules and may include, but are not limited to, predefined dates/time intervals, changes in legal status, including a death, attaining a predefined length of existence, reaching a legal length of existence, marital or the like.

At Event 540, in response to determining/detecting an event, at Event 550, event data is stored as a block within the distributed ledger. The storing of the event data in the data block of the distributed ledger certifies that the event has been validated as authentic and accurate. In specific embodiments of the method the event is validated prior to storing the event data in the data block, in accordance with validation requirements defined by the rules of the digital trust, by having a plurality of the nodes reach a validation consensus.

At Event 560, one or more beneficiaries are determined/identified for receiving a distribution of assets from the trust. The beneficiaries may be determined based on rules within the digital trust and may be dictated by the type of event detected or the parties associated with the event. In specific embodiments of the method, determining the beneficiaries may include verifying/validating the identity of the beneficiaries, in accordance with validation requirements defined by the rules of the digital trust, by having a plurality of the nodes reach an identity verification consensus. At Event 570, a portion of the assets is determined/calculated for each of the one or more beneficiaries. Rules within the trust may define the portion of the assets to be allotted to each of the one or more beneficiaries. The portion may be a specific amount of assets, a percentage of assets from an overall distribution or the like.

At Event 580, distribution transactions are initiated that result in the distribution of assets from the trust to the one or more beneficiaries in accordance with the determined apportionments. Initiating the distribution transactions may include, but is not limited to, generate distribution transaction instructions and communicating the instructions to a trustee, e.g., a transaction processing entity/system authorized or controlled by the trustee.

In response to completing the distribution transaction(s), at Event 590 distribution transaction data is stored as a block within the distributed ledger. The storing of the distribution transaction data in the data block of the distributed ledger certifies that the distribution transaction has occurred as specified. In specific embodiments of the method the resource distribution is validated prior to storing the resource distribution data in the data block, in accordance with validation requirements defined by the rules of the digital trust, by having a plurality of the nodes reach a resource distribution validation consensus.

Thus, present embodiments of the invention provide for managing a digital trust within a distributed trust computing network. The distributed trust computing network ensures immutability of the trust agreement, i.e., the trust cannot be changed or challenged. Additionally, since the distributed trust computing network serves as a source of truth, events, actions and identities associated with the trust are verified with a high level of certainty.

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing a digital resource vehicle for beneficiary output, the system comprising:
a distributed trust computing network comprising a plurality of decentralized nodes, each decentralized node having a first memory and at least one first processor in communication with the first memory, wherein the first memory of the decentralized nodes is configured to store at least one distributed ledger comprising a plurality of blocks that store data, wherein the distributed trust computing network is configured to certify that the data stored in the blocks is authentic and unaltered;
a computing platform disposed in the distributed trust computing network and including a second memory and at least one second processor in communication with the second memory, wherein the second memory stores a digital resource vehicle including instructions that are executable by the second processor and configured to:
monitor for an occurrence of a plurality of first events that trigger an output of resources from the digital resource vehicle,
in response to determining the occurrence of one of the plurality of first events:
store data associated with the first event as at least a portion of a block within one of the distributed ledgers of the distributed trust computing network,
determine one or more beneficiaries for receiving at least a portion of the output of resources from the digital resource vehicle,
determine, for each of the one or more beneficiaries, the portion of the output of resources from the digital resource vehicle, and
initiate one or more resource events that result in output of resources from the resource vehicle to the one or more determined beneficiaries in the determined portions,
store data associated with each of the one or more resource events as at least a portion of a block within one of the distributed ledgers of the distributed trust computing network,
monitor for an occurrence of a plurality of second events that trigger a valuation of at least a portion of the resources of the digital resource vehicle,
in response to determining the occurrence of one of the plurality of second events:
store data associated with the second event as at least a portion of a block within one of the distributed ledgers of the distributed trust computing network, and
initiate the valuation of the at least a portion of the resources of the digital resource vehicle, and
store data associated with the valuation as at least a portion of a block within one of the distributed ledgers of the distributed trust computing network.

2. The system of claim 1, wherein the instructions are further configured to, in response to determining the occurrence of one of the plurality of first events, determine, from the digital resource vehicle, validation requirements for validating the occurrence of the first event.

3. The system of claim 2, wherein the instructions are further configured to, in response to receiving the validation requirements, validate an authenticity of the occurrence of the first event through consensus by the plurality of decentralized nodes of the distributed trust computing network.

4. The system of claim 3, wherein storing data associated with the first event as at least a portion of a block within one of the distributed ledgers provides verification that the authenticity of the first event has been validated through consensus by the plurality of decentralized nodes of the distributed trust computing network.

5. The system of claim 1, wherein the instructions are further configured to determine, from the digital resource vehicle, validation requirements for validating an occurrence of the one more resource events.

6. The system of claim 5, wherein the instructions in response to receiving the validation requirements, validate an authenticity of the occurrence of the one or more resource events through consensus by the plurality of decentralized nodes of the distributed trust computing network.

7. The system of claim 6, wherein storing data associated with each of the one or more resource events as at least a portion of a block within one of the distributed ledgers provides verification of the occurrence of the one or more resource events.

8. The system of claim 1, wherein the instructions are further configured to monitor for the occurrence of the plurality of events, wherein the plurality of events include predefined dates included within or determinable from the digital resource vehicle.

9. The system of claim 1, wherein the instructions are further configured to monitor for the occurrence of the plurality of events, wherein the plurality of events include a change in status of an entity associated with the digital resource vehicle.

10. The system of claim 1, wherein initiating one or more resource events further comprises generating instructions for the one or more resource events and communicating the instructions to one or more holders of the resources of the digital resource vehicle.

11. The system of claim 1, wherein the instructions are further configured to determine, from the digital resource vehicle, identity verification requirements for verifying identity of the one or more beneficiaries.

12. The system of claim 11, wherein the instructions are further configured to, in response to receiving the identity verification requirements for at least one of the beneficiaries, verify an identity of the at least one of the beneficiaries through consensus by the plurality of decentralized nodes of the distributed trust computing network.

13. The system of claim 1, wherein the instructions are further configured to monitor a plurality of external information sources for the occurrence of the plurality of events that trigger the output of resources from the digital resource vehicle.

14. A computer-implemented method for managing a digital resource vehicle for beneficiary output, the method implemented by one or more processing devices and including:

storing a digital resource vehicle within a distributed trust computing network comprising a plurality of decentralized nodes, each decentralized node having a first memory and at least one first processor in communication with the memory, wherein the first memory of the decentralized nodes is configured to store at least one distributed ledger comprising a plurality of blocks that store data, wherein the distributed trust computing network is configured to certify that the data stored in the blocks is authentic and unaltered;

executing the digital resource vehicle to:
monitor for an occurrence of a plurality of events that trigger an output of resources from the digital resource vehicle,
in response to determining the occurrence of one of the plurality of events:
store data associated with the event as at least a portion of a block within one of the distributed ledgers of the distributed trust computing network,
determine one or more beneficiaries for receiving at least a portion of the output of resources from the digital resource vehicle,
determine, for each of the one or more beneficiaries, the portion of the output of resources from the digital resource vehicle, and
initiate one or more resource events that result in output of resources from the digital resource vehicle to the one or more determined beneficiaries in the determined portions,
store data associated with each of the one or more resource events as at least a portion of a block within one of the distributed ledgers of the distributed trust computing network,
monitor for an occurrence of a plurality of second events that trigger a valuation of at least a portion of the resources of the digital resource vehicle,
in response to determining the occurrence of one of the plurality of second events:
store data associated with the second event as at least a portion of a block within one of the distributed ledgers of the distributed trust computing network, and
initiate the valuation of the at least a portion of the resources of the digital resource vehicle, and
store data associated with the valuation as at least a portion of a block within one of the distributed ledgers of the distributed trust computing network.

15. The computer-implemented method of claim 14, wherein executing the digital resource vehicle further comprises executing the digital resource vehicle to, in response to determining the occurrence of one of the plurality of events:
determine, from the digital resource vehicle, validation requirements for validating the occurrence of the event, and
in response to receiving the validation requirements, validate an authenticity of the occurrence of the event through consensus by the plurality of decentralized nodes of the distributed trust computing network,
wherein storing data associated with the event as at least a portion of a block within one of the distributed ledgers provides verification that the authenticity of the event has been validated through consensus by the plurality of decentralized nodes of the distributed trust computing network.

16. The computer-implemented method of claim 14, wherein executing the digital resource vehicle further comprises executing the digital resource vehicle to:
determine, from the digital resource vehicle, validation requirements for validating an occurrence of the one more resource events; and
in response to receiving the validation requirements, validate an authenticity of the occurrence of the one or more resource events through consensus by the plurality of decentralized nodes of the distributed trust computing network,
wherein storing data associated with each of the one or more resource events as at least a portion of a block within one of the distributed ledgers provides verification of the occurrence of the one or more resource events.

17. A computer program product comprising:
a non-transitory computer-readable medium comprising:
a first set of codes for causing a computer to monitor for an occurrence of a plurality of first events that trigger an output of resources from a digital resource vehicle stored within a distributed trust computing network comprising a plurality of decentralized nodes, each decentralized node having a first memory and at least one first processor in communication with the memory, wherein the first memory of the decentralized nodes is configured to store at least one distributed ledger comprising a plurality of blocks that store data, wherein the distributed trust computing network is configured to certify that the data stored in the blocks is authentic and unaltered;
a second set of codes for causing a computer to, in response to determining the occurrence of one of the plurality of events, store data associated with the event as at least a portion of a block within one of the distributed ledgers of the distributed trust computing network;
a third set of codes for causing a computer to, in response to determining the occurrence of one of the plurality of events, determine one or more third-party beneficiaries for receiving at least a portion of the output of resources from the digital resource vehicle;
a fourth set of codes for causing a computer to, in response to determining the occurrence of one of the plurality of events, determine, for each of the one or more beneficiaries, the portion of the output of resources from the digital resource vehicle;
a fifth set of codes for causing a computer to, in response to determining the occurrence of one of the plurality of events, initiate one or more resource events that result in output of resources from the digital resource vehicle to the one or more determined beneficiaries in the determined portions; and
a sixth set of codes for causing a computer to store data associated with each of the one or more resource events as at least a portion of a block within one of the distributed ledgers of the distributed trust computing network;
a seventh set of codes for causing a computer to monitor for an occurrence of a plurality of second events that trigger a valuation of at least a portion of the resources of the digital resource vehicle;

an eighth set of codes for causing a computer to, in response to determining the occurrence of one of the plurality of second events (i) store data associated with the second event as at least a portion of a block within one of the distributed ledgers of the distributed trust computing network, and (ii) initiate the valuation of the at least a portion of the resources of the digital resource vehicle; and a ninth set of codes for causing a computer to store data associated with the valuation as at least a portion of a block within one of the distributed ledgers of the distributed trust computing network.

18. The computer program product of claim 17, wherein the second set of codes is further configured to cause the computer to:

determine, from the digital resource vehicle, validation requirements for validating an occurrence of the one more resource events; and in response to receiving the validation requirements, validate an authenticity of the occurrence of the one or more resource events through consensus by the plurality of decentralized nodes of the distributed trust computing network, wherein storing data associated with each of the one or more resource events as at least a portion of a block within one of the distributed ledgers provides verification of the occurrence of the one or more resource events.

\* \* \* \* \*